United States Patent
Takeda (10) Patent No.: US 8,261,670 B2
(45) Date of Patent: Sep. 11, 2012

(54) SUSPENDED ROBOT SYSTEM (75) Inventor: Shigeru Takeda, Okazaki (JP)

(73) Assignee: Denso Wave Incorporated, Tokyo (JP)

( * ) Notice: Subject to any disclaimer, the term of this patent is extended or adjusted under 35 U.S.C. 154(b) by 265 days.

(21) Appl. No.: 12/292,198

(22) Filed: Nov. 13, 2008

(65) Prior Publication Data
US 2009/0126598 A1    May 21, 2009

(30) Foreign Application Priority Data
Nov. 15, 2007 (JP) .................................. 2007-296802

(51) Int. Cl.
*B61B 3/00* (2006.01)
(52) U.S. Cl. ...................... 105/148; 191/12 R; 191/12 C
(58) Field of Classification Search .................. 105/148; 138/120; 174/19, 68.1, 68.3; 248/49; 385/114; 59/78.1; 191/12 R, 12 C
See application file for complete search history.

(56) References Cited

U.S. PATENT DOCUMENTS

| 4,373,324 | A  | * | 2/1983  | Janos ............................ 59/78.1 |
| 6,323,428 | B1 | * | 11/2001 | Takano ...................... 174/117 F |

FOREIGN PATENT DOCUMENTS

| JP | A-05-169379 | 7/1993 |
| JP | A-07-052078 | 2/1995 |

* cited by examiner

*Primary Examiner* — Mark Le
(74) *Attorney, Agent, or Firm* — Oliff & Berridge, PLC (57) ABSTRACT

A plurality of cables is unified into a parallel in a vertical direction state to constitute a flat cable, and the flat cable is pressed against an internal surface of a perimeter of the Cableveyor. Further, both ends of the flat cable are fixed such that the flat cable touches neither upper or lower inner surface of the Cableveyor by slanting up both ends of the accommodated portion of the flat cable.

4 Claims, 8 Drawing Sheets

SUSPENDED ROBOT SYSTEM

CROSS-REFERENCE TO RELATED APPLICATION

This application is based on and claims the benefit of priority from earlier Japanese Patent Application No. 2007-296802 filed on Nov. 15, 2007, the description of which is incorporated herein by reference.

BACKGROUND OF THE INVENTION

1. Technical Field of the Invention

The present invention relates to a suspended type robot system that supports a main robot body suspended movably on a rail.

2. Description of the Related Art

As shown in Japanese Patent Application Laid-Open Publication No. 5-169379, for example, there is provided a suspended type robot system having a pair of supporting pillars mounted on a mounting base installed on a floor, a substantially straight rail spanned between the pair of supporting pillars, and a main robot body that is supported on the rail so that the main robot body becomes movable in both ways along with the rail.

Although not disclosed in No. 5-169379, in order to connect power supply cables, signal cables, etc. to the suspended type robot system without interfering with the movement of the main robot body, a flexible cable protecting means such as shown in Japanese Patent Application Laid-Open Publication No. 7-52078 (also refer to FIG. 9), for example, is used, and a plurality of above-mentioned cables are contained in the cable protecting means.

Connecting many frames flexibly by pins constitutes the cable protecting means, and the position of the bent portion bent in a U shape changes continuously with the movement of the main robot body.

When the cable protecting means is bent with the movement of a main robot body, a plurality of cables contained in such cable protecting means are rubbed mutually, or rubbed with the cable protecting means, thus noise is produced or the cables are worn.

SUMMARY OF THE INVENTION

The present invention has been made in order to solve the issue described above, and has as its object to provide a suspended type robot system that prevents the cables rubbing mutually or with the protecting means as much as possible when the cable protecting means is bent, so that problems of noise and wear are solved.

In the suspended type robot system according to a first aspect, there is provided a suspended type robot system comprising a base suspended from a substantially straight rail movably in both ways along with the rail, a main robot body having an arm arranged rotatably on the base, a flexible cable protecting means bent horizontally in the middle portion thereof in which one end is connected with the rail while the another end is connected with the main robot body, and a plurality of cables, which connect between a fixed apparatus and the main robot body, passing through the cable protecting means.

In addition, a plurality of cables are unified into a parallel state to constitute a flat cable, and the flat cable is accommodated in the cable protecting means by arranging the cables in a vertical direction, an outer surface or inner surface of an accommodated portion of the flat cable in the cable protecting means is pressed against an internal surface of a perimeter or an inner circumference of the cable protecting means by a restraining means, and/or both upper and lower surfaces of the accommodated portion of the flat cable in the cable protecting means are kept from touching to either upper and lower internal surfaces of the cable protecting means by a floating means.

Consequently, the state where the cables were as if fixed to the cable protecting means occurs due to the restraining force, and movement of the cables decreases.

Moreover, since rubbing contact between the cable protecting means and the cable is prevented, even if the bent portion of the cable protecting means changes its shape with the movement of the main robot body, the cable can be prevented from rubbing against the cable protecting means as much as possible.

In the suspended type robot system according to a second aspect, both ends of the flat cable accommodated in the cable protecting means are fixed to the rail and the main robot body in the state where the restraining means presses the flat cable against the inside of the cable protecting means.

This is achieved by setting the length of the flat cable to match the distance of an outer perimeter of an accommodation space in the cable protecting means from one opening to another opening.

Alternatively, both ends of the flat cable accommodated in the cable protecting means are fixed to the rail and the main robot body such that the restraining means presses the flat cable to the internal surface of the inner circumference of the cable protecting means by setting the length of the flat cable pulled out from the both ends of the cable protecting means to match the distance of an inner circumference of an accommodation space in the cable protecting means from one opening to another opening.

In the suspended type robot system according to a third aspect, the both ends of the flat cable accommodated in the cable protecting means are fixed to the rail and the main robot body such that the floating means slants up both ends of a flat cable so that the upper surface of the accommodated portion of the flat cable does not touch an upper inside surface of the cable protecting means, and the lower surface of the accommodated portion of the flat cable is floated above a lower inside surface of the cable protecting means.

In this invention, a cable is not restricted to an electric wire, but includes a hose, a tube, etc. that high-pressure fluid (for example, pressured oil, compressed air) etc. passes through, which connects the fixed apparatus and the main robot body, and is contained in the protecting means.

DETAILED DESCRIPTION OF THE PREFERRED EMBODIMENTS

With reference to the accompanying drawings, hereinafter will be described a first embodiment of the present invention.

Figure 1:
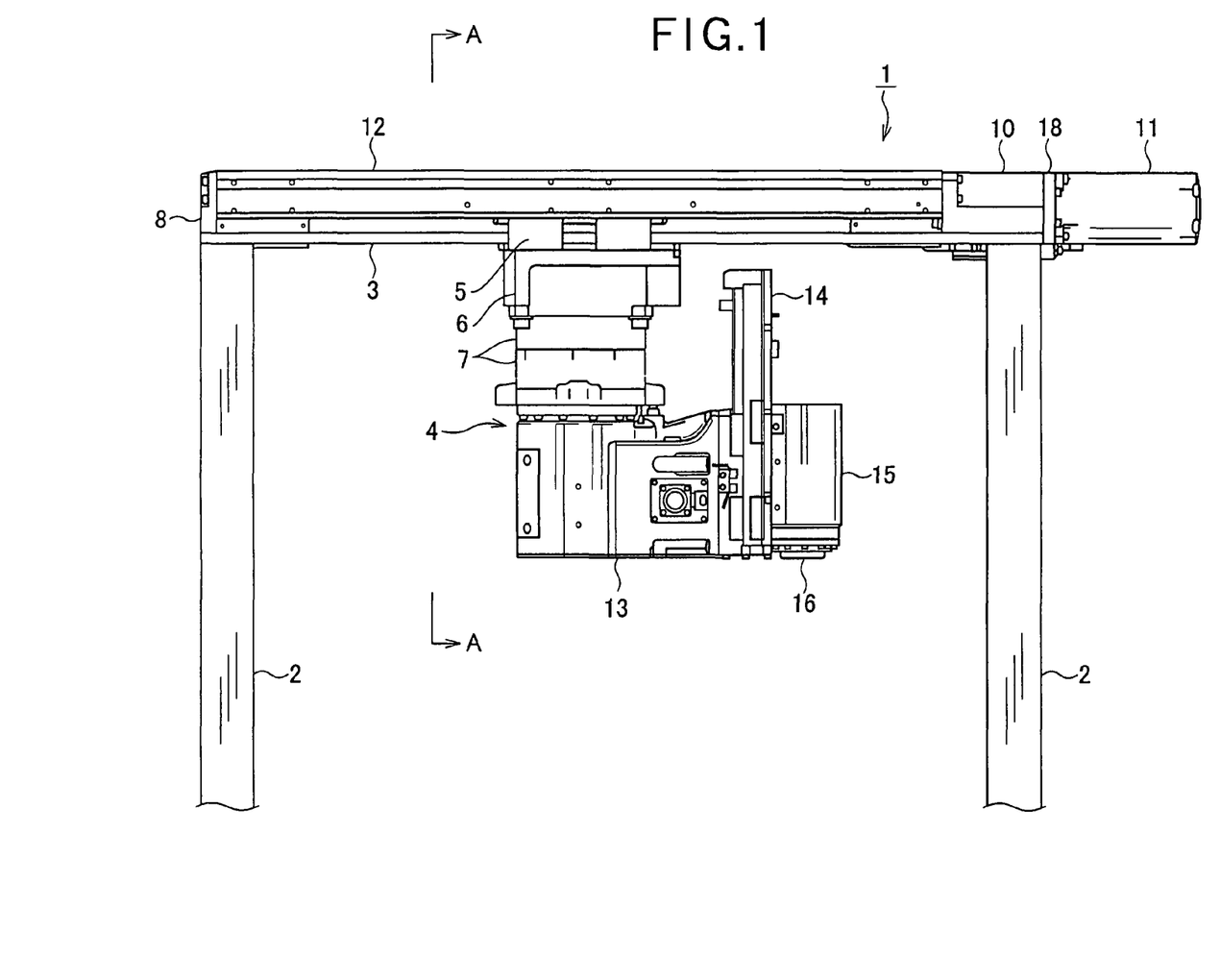
FIG. 1 shows an elevational view of a suspended type robot.
Figure 2:
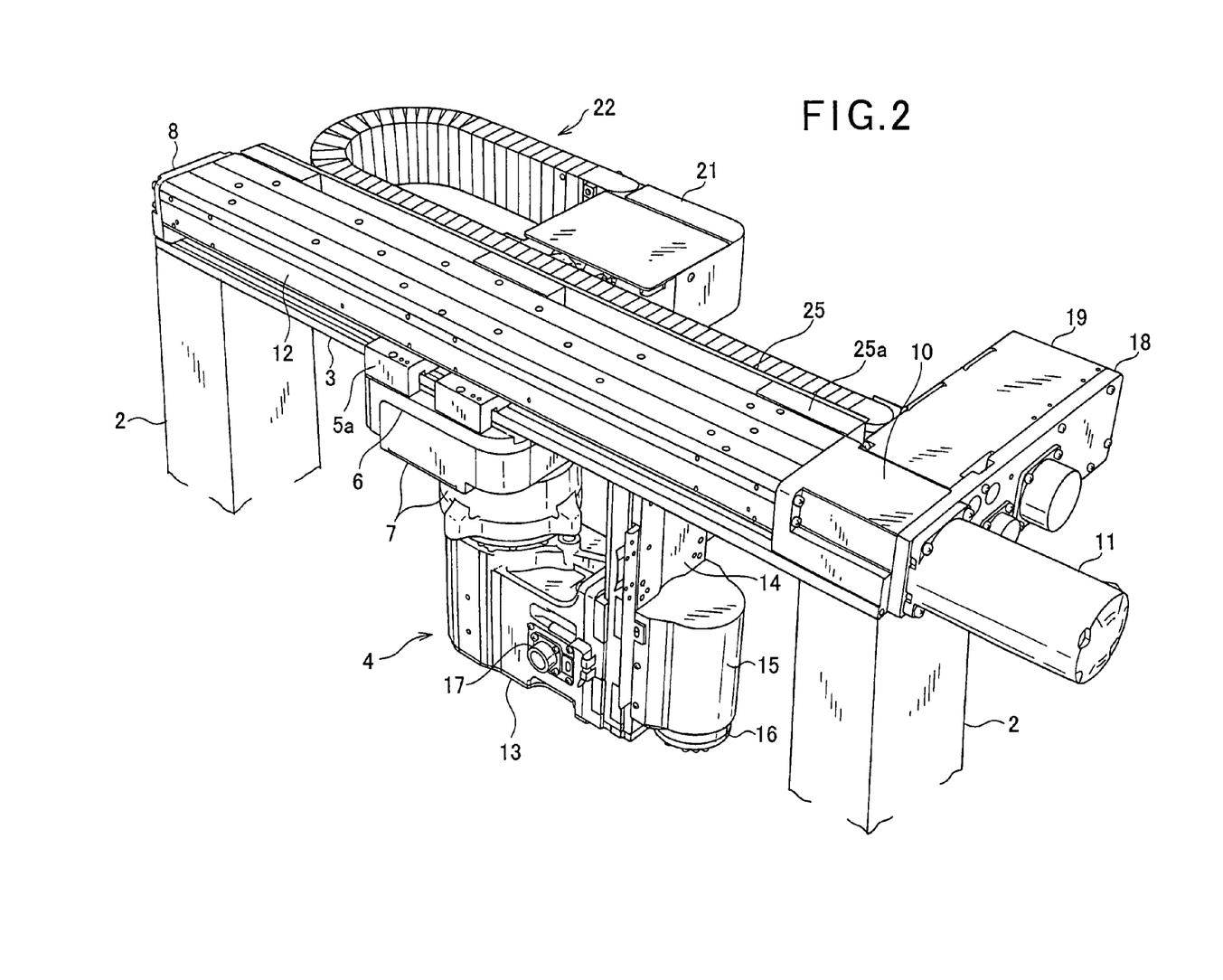
FIG. 2 shows a perspective view of a suspended type robot.

As shown in FIGS. 1 and 2, a suspended type robot 1 comprises with a pair of supporting pillars 2, a substantially straight rail 3 spanned between the pair of supporting pillars 2, and a main robot body 4. The main robot body 4 is suspended movably in both right and left ways.

The composition of the main robot body 4 and its suspending composition are as follows.

Figure 3:
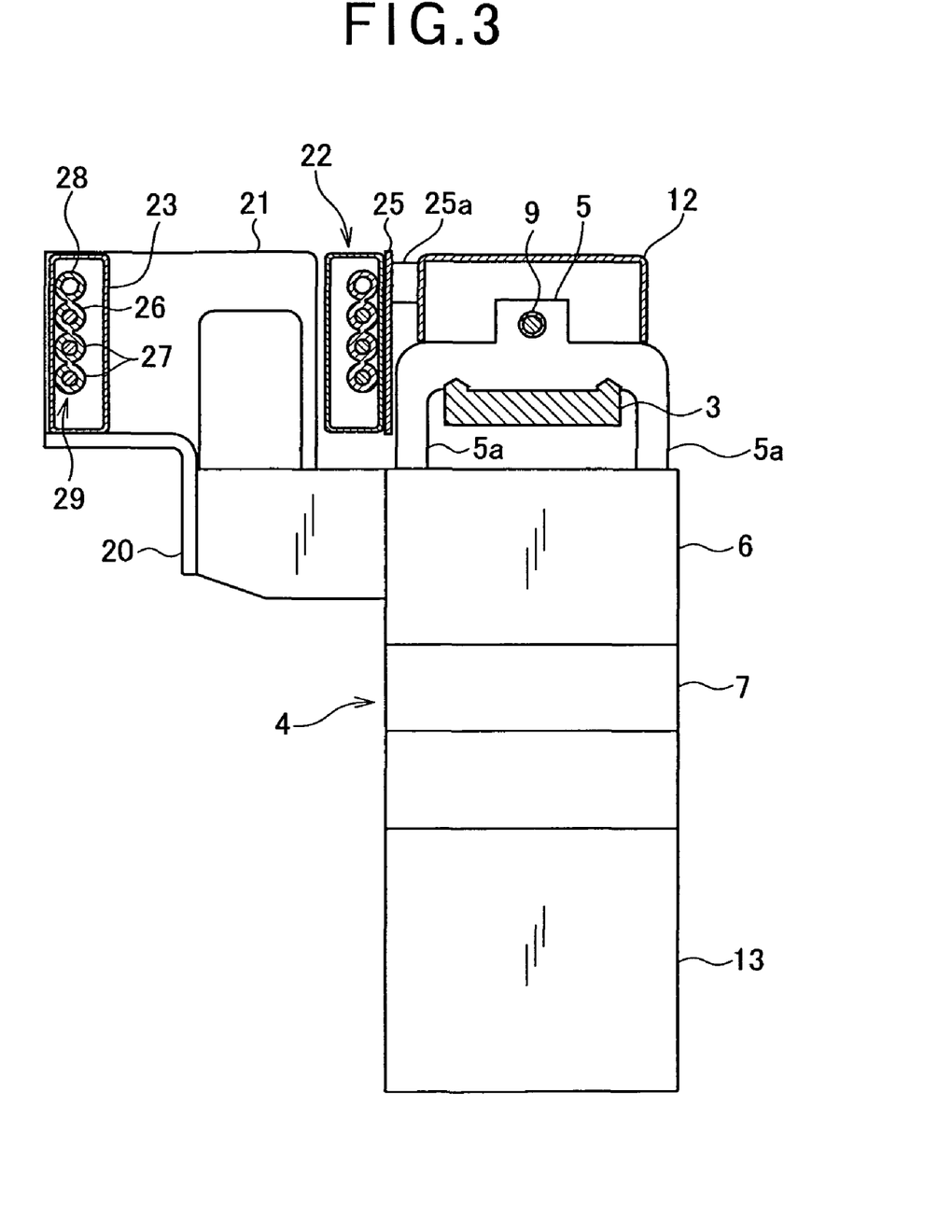
FIG. 3 shows a sectional view taken along the line A-A of FIG. 1.

That is, as shown in FIG. 3, a movable body 5 is supported on the rail 3 movably in both ways, and suspension parts 5a are formed on the both right and left sides of the movable body 5.

In addition, a base member 6 is fixed between the suspension parts sa of the movable body 5, and a base 7 is attached to an undersurface of the base member 6.

Thereby, the base 7 becomes movable in both ways along the rail 3 while the base 7 is suspended from the rail 3 via the movable body 5.

Brackets 8 (only one side is shown) are fixed to both left and right sides of the rail 3, and a screw shaft 9 of a ball screw mechanism (straight-moving mechanism) is rotatably supported between both the brackets 8.

The screw shaft 9 is screwed with the nut (not shown) of the ball screw mechanism fixed to the movable body 5 of the base 7.

A connecting unit 10 arranged on the rail 3 is attached to the bracket 8 provided on the right end of the rail 3, and a motor 11 is connected with the connecting unit 10. The screw shaft 9 is rotated in either direction by the motor 11 via the connecting unit 10.

Further, the rotation of the screw shaft 9 moves the movable body 5, or the base 7 to the left or right according to the rotational direction of the screw shaft 9.

The screw shaft 9 is covered with a cover 12 attached between both the brackets 13.

An arm 13 is arranged rotatably on a lower part of the base 7.

The arm 13 is rotatably in either direction by a motor (not shown) via a belt transmission mechanism (not shown) both disposed in the base 7.

The center of turning of the arm 13 is arranged off set to the side, to the front, for example, of a centerline in a width direction of the rail 3, when seen from the top.

The center of turning of the arm 13 may be matched with the centerline in the width direction of the rail 3.

An elevating board (an elevating body) 14 is supported movably in the direction of up and down at a tip part of the arm 13.

A vertical-axis type motor 15 is attached to the elevating board 14, and a wrist member 16 is attached to the lower end of a shaft (not shown) of the vertical-axis type motor 15.

A chuck (not shown) is attached on the wrist member 16, and the chuck grasps the work piece or the like.

Since the chuck is generally constituted considering an air cylinder (not shown) as a source of a power, a connector 17 that transmits electric signals for checking the opening-and-closing of the chuck by the above-mentioned air cylinder is attached on the outside part of the arm 13.

The main robot body 4 is constituted from the above-mentioned base 7, the arm 13, the elevating board 14 and the wrist member 17, and moves in both ways along with the rail 3 while the base 7 is suspended to the rail 3 by the movable body 5.

Now, an attachment plate 18 is fixed, as shown in FIG. 2, between the connecting unit 10 and the motor 11.

The attachment plate 18 extends to one side of the axis of connecting unit 10 and motors 11. A connection box 19 is located on to one side of the attachment plate 18

In addition, a receptacle board 20 is projected backwardly from the backside of the base member 6 of the main robot body 4, and a distribution box 21 is attached on the receptacle board 20.

The connection box 19 and the distribution box 21 are located mutually at the same height.

With the movement of the main robot body 4, the distribution box 21 moves away from the connection box 19, or approaches to the connection box 19.

Between the above-mentioned connection box (fixed apparatus side) 19 and the distribution box (main robot body side) 21, there is provided a Cableveyor (registered trademark) 22 as a cable protecting means that is flexible.

Connecting a plurality of frames 23 horizontally and flexibly constitutes the Cableveyor 22.

Figure 4:
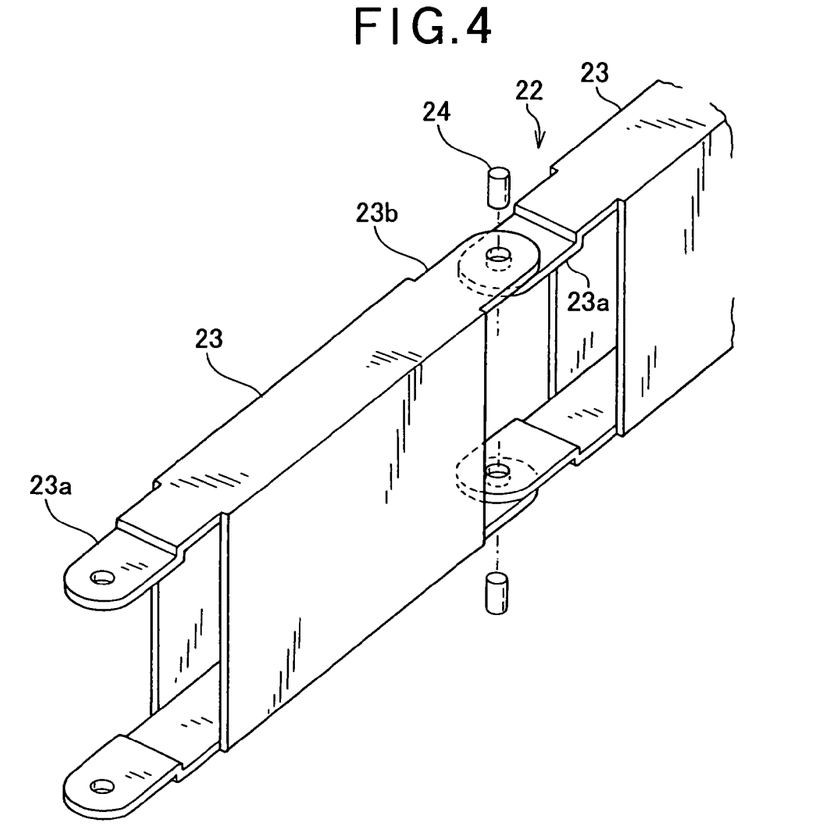
FIG. 4 shows a perspective diagram of the frame that constitutes a Cableveyor.

That is, as shown in FIG. 4, the frame 23 has a sectional shape of a flat box, longer in vertical direction, and connection pieces 23a and 23b are extended on both top and bottom sides of both ends.

Further, connecting the connecting pieces 23a and 23b of a plurality of frames 23 horizontally rotatable by pins 24 constitutes the horizontally flexible Cableveyor 22.

As for this Cableveyor 22, the frame 23 by the side of one end is connected with the connection box 19, while the frame 23 of another end is connected with the distribution box 21.

In addition, the Cableveyor 22 is bent in a U shape in the middle portion between the connection box 19 and the distribution box 21, and a bent position changes with the movement of the main robot body 4.

A protection board 25 for avoiding contact with the movable body 5 and the Cableveyor 22 is fixed to one side of the rail 3 via a spacer 25a.

This protection board 25 forms the crevice where the suspension part 5a of the movable body 5 can move between the rail 3 and the protection board 25.

Figure 5:
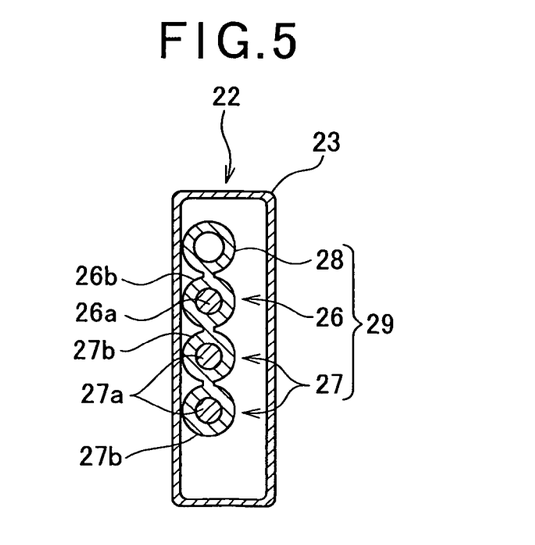
FIG. 5 shows a sectional view of the Cableveyor that contains a flat cable.

In the above-mentioned Cableveyor 22, as shown also in FIG. 5, a plurality of cables that connect between the connection box 19 and the distribution boxes 21 are passed through the Cableveyor 22. In the present embodiment in particular, there are a total of four cables that includes one power cable 26, two signal cables 27, and one compressed air cable 28.

Both the power cable 26 and the signal cable 27 come to cover leads 26a and 27a with the outside covering 26b and 27b, and the compressed air cable 28 consists of a resisting pressure tube which can withstand high-pressure.

Welding or gluing to be as a flat cable 29 unifies the above-mentioned cables 26-28. The flat cable 29 is changed into a parallel state by locating the compressed air cable 28 made by a resisting pressure tube with rigidity in the most outer side.

Further, the flat cable 29 is accommodated in the Cableveyor 22 by arranging the cables 26-28 in a vertical direction, and the compressed air cable 28 made by the resisting pressure tube with rigidity comes at the top.

Figure 6:
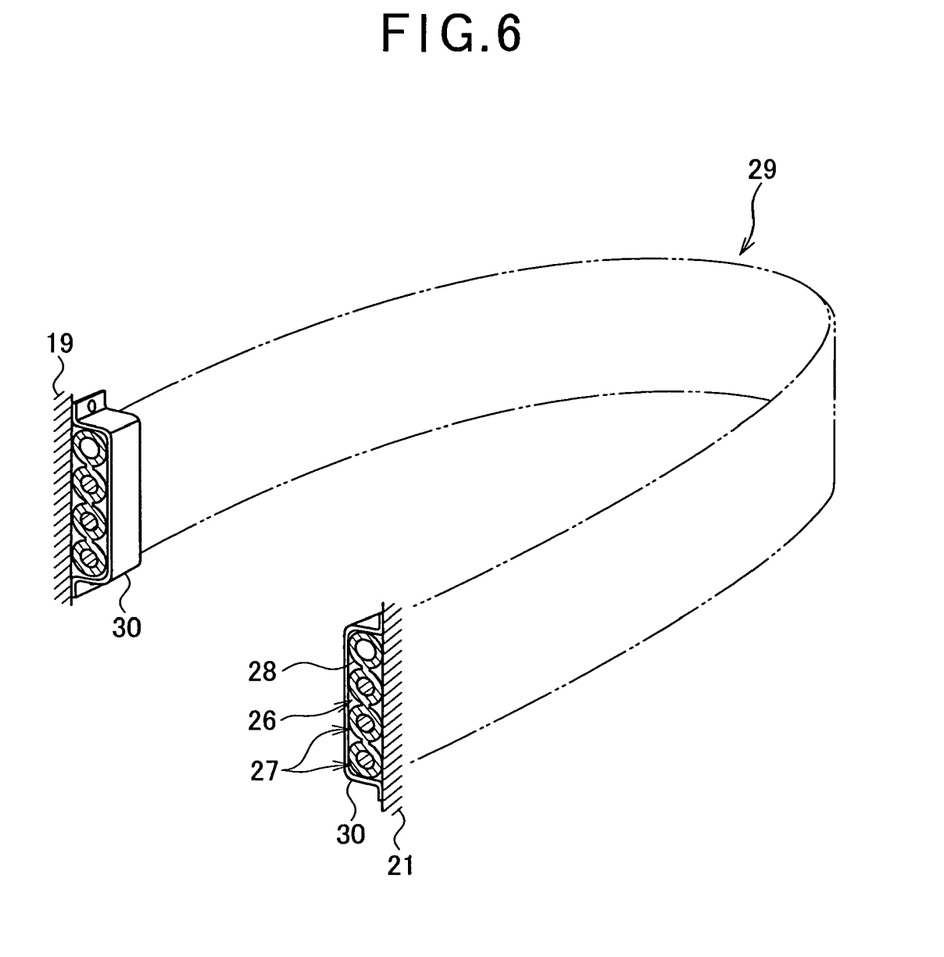
FIG. 6 shows a perspective diagram of a fixed structure for both ends of the flat cable in a sectional view.

The both ends of the above-mentioned flat cable 29 are introduced into the connection box 19 and the distribution box 21 from the both ends of the Cableveyor 22, and fixed to the connection box 19 and the distribution box 21, respectively by a fastening implement (fastening means) 30 as shown in FIG. 6.

Further, a power cable 26 is connected to a power supply cable (not shown) extended from a power supply feed unit (not shown) inside the connection box 19, the signal cable 27 is connected to a signal wire (not shown) extended from a control device (not shown), and the compressed air cable 28 is connected to a compressed air hose (not shown) extended from a compressed air supplier (not shown), respectively.

In addition, the power cable 26 is connected to a feeder line (not shown), which is connected to the motor 11 for the rotation of the arm 13, an elevating motor (not shown) for elevating the elevating board, the motor 15 for rotation of the wrist member 16, a connector 17, and an electromagnetic valve (not shown) that controls a supply of an air into an air cylinder (not shown), etc. In the distribution box 21. Moreover, the signal cable 27 is so connected to a signal wire (not shown) extended from drivers, such as each motors 11 and 15 and the electromagnetic valve, and the compressed air cable 28 is connected to a compressed air tube (not shown) extended from the electromagnetic valve.

Figures 7A, 7B:
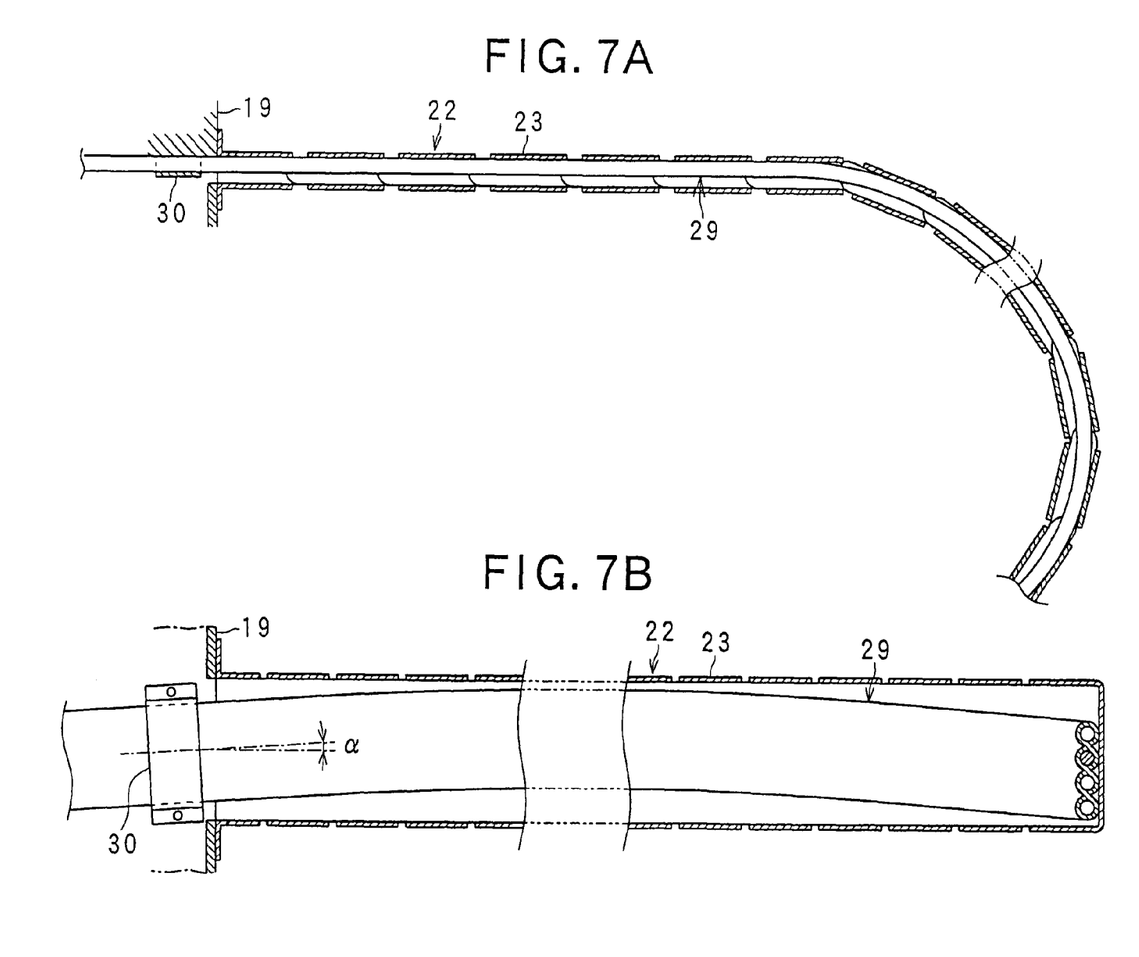
FIG. 7A is the sectional view, in which shows one embodiment of the present invention, showing the flat cable restrained to an inside of the Cableveyor in a perimeter side by a restraining means.
FIG. 7B is the sectional view, which shows one embodiment of the present invention, showing the flat cable held out of contact with both the top and bottom inside surfaces of the Cableveyor by a floating means.

Now, as shown in FIG. 7A, a side of the perimeter of the above-mentioned flat cable 29 is pressed against the internal surface of the perimeter of the Cableveyor 22, for example, and this state is maintained. In addition, as shown in FIG. 7B, the above-mentioned flat cable 29 is maintained so that neither top or bottom surfaces thereof touch either the top or bottom internal surfaces of the Cableveyor 22. This maintenance composition is explained hereafter.

Specifically, both ends of the flat cable 29 accommodated in the Cableveyor 22 are fixed to the connection box 19 and the distribution box 21 by the fastening means, brackets 30 in this embodiment for example, respectively.

Further, at the time of the fastenings by this brackets 30, the side of the perimeter of the flat cable 29 is pressed against the internal surface of the perimeter of the Cableveyor 22 by setting the length of the flat cable 29 supplied from the both ends of the Cableveyor 22 to match the distance of the outer perimeter of the accommodation space in the Cableveyor 22 from one opening to another opening.

In addition, the flat cable 29 is such that its intermediate portion floats by its own rigidity so that it does not touch the lower inside surface of the Cableveyor 22, by slanting up the both ends of a flat cable 29 to a degree, as shown in FIG. 7B.

Finally, both ends of the flat cable 29 are fixed to the connection box 19 and the distribution box 21 with the brackets 30, respectively, in the above state.

As described above, the side of the perimeter of the flat cable 29 is pressed against the internal surface of the perimeter of the Cableveyor 22, and keeps the flat cable 29 away from touching either the upper or the lower internal surfaces of the Cableveyor 22 by matching the length of the portion of the flat cable 29 that is accommodated into Cableveyor 22 to the internal surface of the perimeter of the Cableveyor 22 and fixing the both ends of the flat cable 29 in this state by using the brackets 30 (a restraining means), and by the use of the brackets 30 (a floating means) to slant the both ends of the flat cable 29 up.

Especially, the fixed state to the Cableveyor 22 can be performed by only length adjustment of the flat cable 29, hence there is no need for preparing another forcing implement.

Moreover, especially the floating state can be imparted to the flat cable 29, since the cable is flat, only by changing the attaching angle of the flat cable, hence there is no need for preparing the floating implement.

Consequently, the restraining means and the floating means (brackets 30) can be made simple and inexpensive.

Since the flat cable 29 is unified by a plurality of cables 26-28 and the compressed air cable 28 is made by the resisting pressure tube with rigidity, the flat cable 29 does not buckle nor hung down and touch the bottom of the internal surface of the Cableveyor 22

Thus, according to the present embodiment, since four cables 26-28 are unified and constituted as the flat cable 29, the situation where cables 26-28 rub each other does not occur when the Cableveyor 22 is bent.

Further, since the side of the perimeter of the flat cable 29 is pressed against the internal surface of the perimeter of the Cableveyor 22, rubbing against the Cableveyor 22 is prevented for the side of the inner circumference of the flat cable 29 that is not in contact with the Cableveyor 22, and also, the side of the perimeter of the flat cable 29 which is in contact with the side of the perimeter of the Cableveyor 22.

Moreover, since neither top or bottom surfaces of the flat cable 29 contact with either top or bottom internal surfaces of the Cableveyor 22, even if the Cableveyor 22 is bent, flat cable 29 will not rub against the Cableveyor 22, and the present invention can prevent wear of the flat cable 29.

Figure 8:
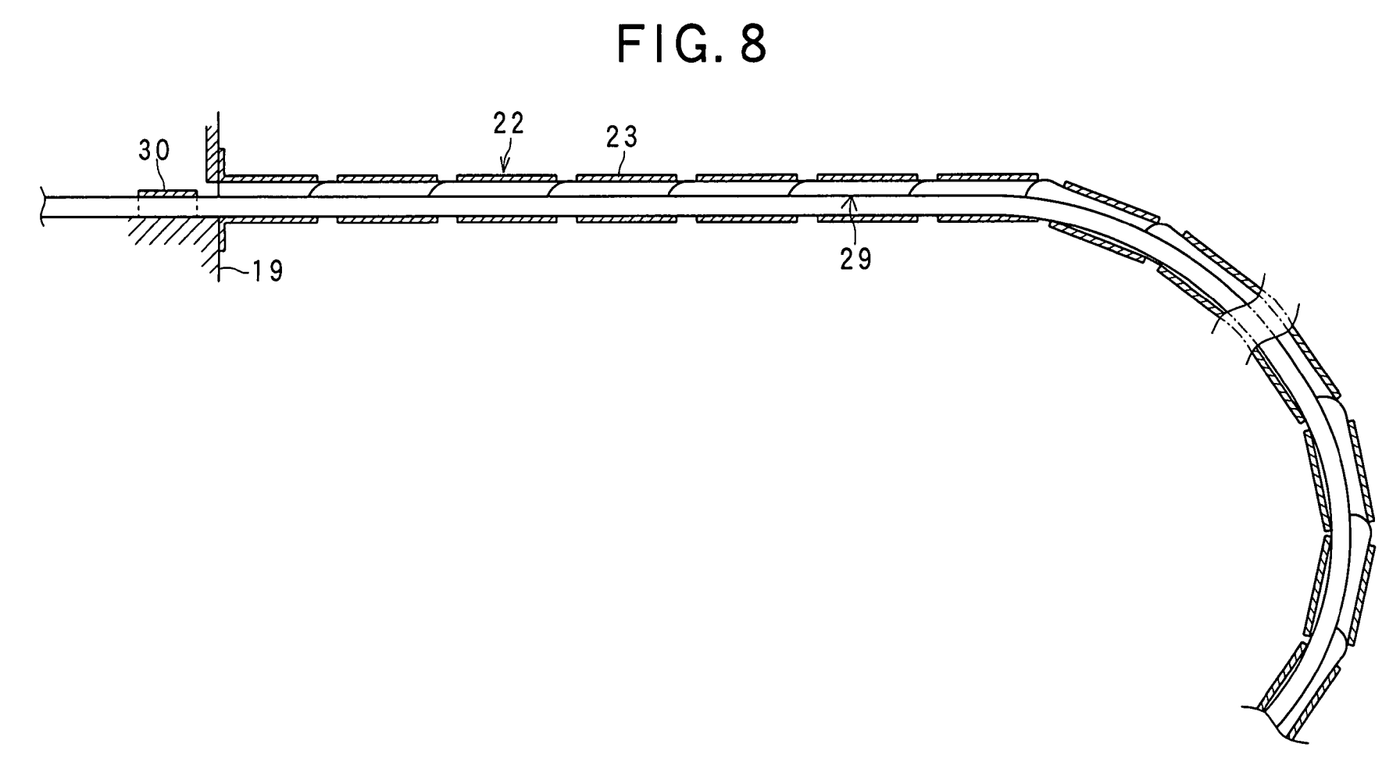
FIG. 8 shows another embodiment of the present invention equivalent to FIG. 7A.

FIG. 8 shows another embodiment of the present invention.

In this second embodiment, when the flat cable 29 is fixed to the brackets 30, the side of the perimeter of the flat cable 29 is pressed against the internal surface of the inner circumference of the Cableveyor 22 by pulling the flat cable 29 taut against the inner circumference of the accommodation space in the Cableveyor 22 from one opening to another opening.

Then, the both ends of the flat cable 29 are fixed to the connection box 19 and the distribution box 21 with the brackets 30, respectively, in the above state.

This invention is not limited to the above-mentioned embodiments, however, and various implementations of modifications are possible within the limits of the essential points of the present invention.

Either the restraining means or the floating means may be provided.

That is, as long as the flat cable 29 is pressed against the internal surface of the perimeter or the inner circumference of the Cableveyor 22, both top and bottom surfaces of the flat cable 29 may be in contact with both top and bottom internal surfaces of the Cableveyor 22.

Or, as long as both top and bottom surfaces of the flat cable 29 do hot contact with both top and bottom internal surfaces of the Cableveyor 22, the flat cable 29 may not be pressed against the internal surface of the perimeter or the inner circumference of the Cableveyor 22

The number of the cable that constitutes the flat cable 29 is not restricted to four.

Figure 9:
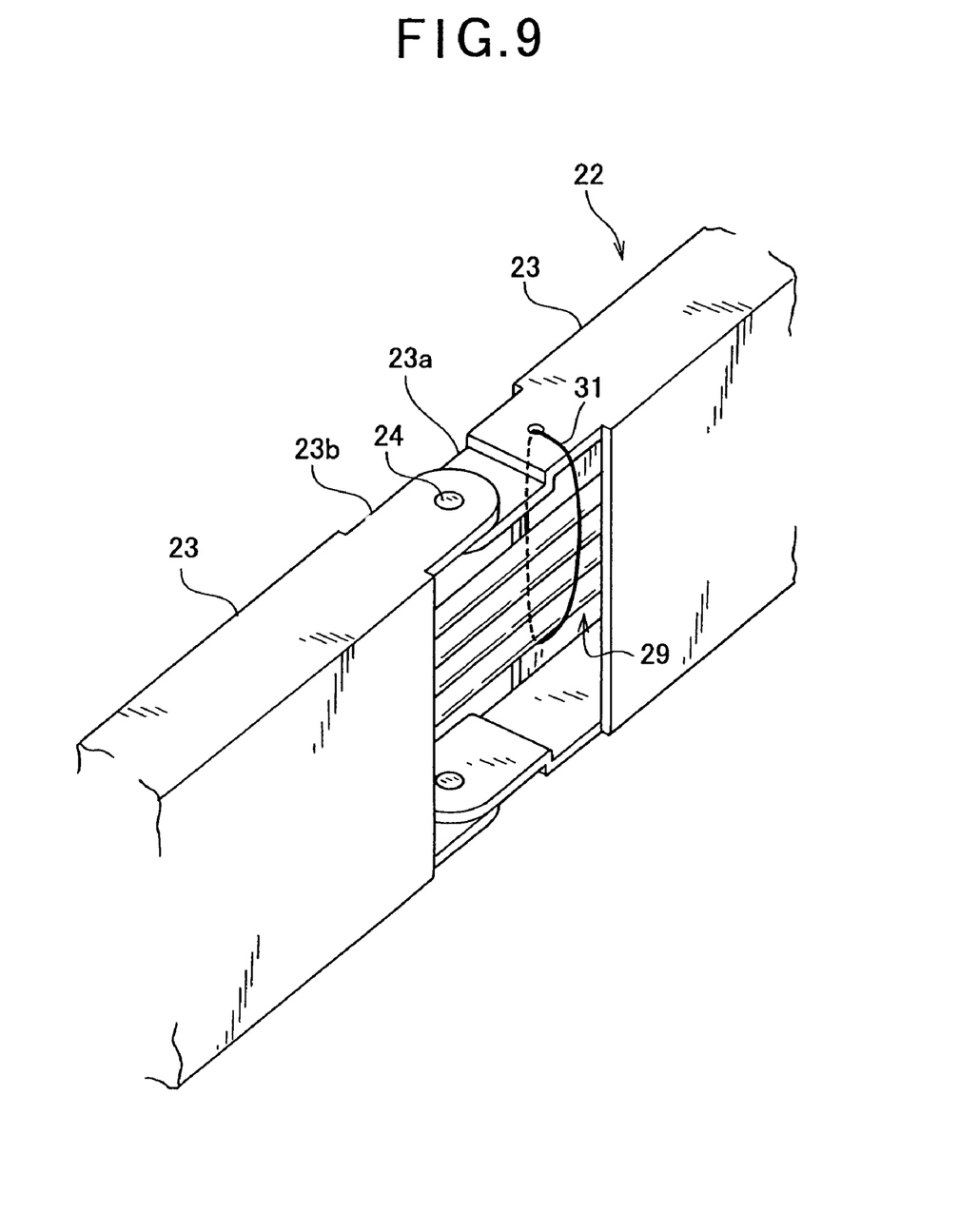
FIG. 9 is a partial perspective diagram of the Cableveyor showing other further different embodiments of the present invention.

The floating means is not restricted to the means to make the both ends of the flat cable 29 slanting up by the brackets 30, but a band (harness) 31 shown in FIG. 9 that suspends the intermediate portion of the flat cable 29 may be used also, for example, in order to maintain the flat cable 29 in the suspended state.

Alternatively, only the band 31 shown in FIG. 9 may be used as the floating means in order to suspend the flat cable 29.

What is claimed is:

1. A suspended robot system comprising:
    a base suspended from a substantially straight rail movably in both ways along with the rail;
    a main robot body having an arm arranged rotatably on the base;
    a flexible cable protecting means bent horizontally in a middle portion thereof in which one end is connected with the rail while another end is connected with the main robot body; and
    a plurality of cables, which connect between a fixed apparatus and the main robot body, passing through within the flexible cable protecting means;
    wherein a plurality of cables are unified into a parallel state to constitute a flat cable, and the flat cable is accommodated in the flexible cable protecting means by arranging the cables in a vertical direction,
    both upper and lower surfaces of an accommodated portion of the flat cable in the flexible cable protecting means are kept away from touching either of upper or lower internal surfaces of the flexible cable protecting means by a floating means, and
    both ends of the flat cable accommodated in the flexible cable protecting means are fixed to the rail and the main robot body in a state where the floating means slants up both ends of the flat cable so that the upper surface of the accommodated portion of the flat cable does not touch an upper inside surface of the flexible cable protecting means, and the lower surface of the accommodated portion of the flat cable is floated from a lower inside surface of the flexible cable protecting means.

2. A suspended robot system comprising:
    a base suspended from a substantially straight rail movably in both ways along with the rail;
    a main robot body having an arm arranged rotatably on the base;
    a flexible cable protecting means bent horizontally in a middle portion thereof in which one end is connected with the rail while another end is connected with the main robot body; and
    a plurality of cables, which connect between a fixed apparatus and the main robot body, passing through within the flexible cable protecting means;
    wherein a plurality of cables are unified into a parallel state to constitute a flat cable, and the flat cable is accommodated in the flexible cable protecting means by arranging the cables in a vertical direction,
    an outer surface or inner surface of an accommodated portion of the flat cable in the flexible cable protecting means is pressed against an internal surface of a perimeter or an inner circumference of the flexible cable protecting means by a restraining means,
    both upper and lower surfaces of the accommodated portion of the flat cable in the flexible cable protecting means are kept away from touching to either of upper or lower internal surfaces of the flexible cable protecting means by a floating means, and
    both ends of the flat cable accommodated in the flexible cable protecting means are fixed to the rail and the main robot body in a state where the floating means slants up both ends of the flat cable so that the upper surface of the accommodated portion of the flat cable does not touch an upper inside surface of the flexible cable protecting means, and the lower surface of the accommodated portion of the flat cable is floated from a lower inside surface of the flexible cable protecting means.

3. A suspended robot system of claim 2,
    wherein the both ends of the flat cable accommodated in the flexible cable protecting means are fixed to the rail and the main robot body in a state where the restraining means holds a side of a perimeter of the flat cable against the internal surface of the perimeter of the flexible cable protecting means by setting a length of the flat cable held by both ends of the flexible cable protecting means to substantially match a distance of an outer perimeter of an accommodation space in the flexible cable protecting means from one opening to another opening.

4. A suspended robot system of claim 2,
    wherein the both ends of the flat cable accommodated in the flexible cable protecting means are fixed to the rail and the main robot body in a state where an inner surface of the flat cable is pressed against the inner surface of the flexible cable protecting means by setting a length of the flat cable held by both ends of the flexible cable protecting means to substantially match a distance of an inner circumference of an accommodation space in the flexible cable protecting means from one opening to another opening.

* * * * *